MAGNETIC TRANSFER DEVICE

Filed June 17, 1963 7 Sheets-Sheet 1

INVENTORS
Harold W. Buus
Frank S. Greenwald
BY
Hill, Sherman, Meroni, Gross & Simpson
ATTORNEYS June 21, 1966 H. W. BUUS ETAL 3,257,141

MAGNETIC TRANSFER DEVICE

Filed June 17, 1963 7 Sheets-Sheet 2

INVENTORS.
Harold W. Buus
Frank S. Greenwald
BY
Hill, Sherman, Meroni, Gross & Simpson ATTORNEYS

MAGNETIC TRANSFER DEVICE

INVENTORS
Harold W. Buus
Frank S. Greenwald
BY
Hill, Sherman, Meroni, Gross & Simpson
ATTORNEYS

MAGNETIC TRANSFER DEVICE

Filed June 17, 1963 7 Sheets-Sheet 4

INVENTORS
Harold W. Buus
BY Frank S. Greenwald
Hill, Sherman, Meroni, Gross & Simpson
ATTORNEYS June 21, 1966 H. W. BUUS ETAL 3,257,141

MAGNETIC TRANSFER DEVICE

Filed June 17, 1963 7 Sheets-Sheet 5

INVENTORS
Harold W. Buus
BY Frank S. Greenwald

Hill, Sherman, Meroni, Gross & Simpson
ATTORNEYS

INVENTOR.
Harold W. Buus
Frank S. Greenwald
BY
Hill, Sherman, Meroni, Gross & Simpson
ATTORNEYS June 21, 1966 H. W. BUUS ETAL 3,257,141

MAGNETIC TRANSFER DEVICE

Filed June 17, 1963 7 Sheets-Sheet 7

INVENTOR.
Harold W. Buus
Frank S. Greenwald
BY
Hill, Sherman, Meroni, Gross & Simpson
ATTORNEYS United States Patent Office
3,257,141
Patented June 21, 1966

3,257,141
MAGNETIC TRANSFER DEVICE

Harold W. Buus, Hales Corner, Wis., and Frank S. Greenwald, Peru, Ill., assignors to Indiana General Corporation, Valparaiso, Ind., a corporation of Indiana Filed June 17, 1963, Ser. No. 288,351
23 Claims. (Cl. 294—65.5)

The present application is a continuation-in-part of our copending application Serial No. 92,664 filed March 1, 1961 (now abandoned) and of our copending application Serial No. 178,011 filed March 7, 1962 (now abandoned).

This invention relates to an article transfer apparatus where an array of individual articles is held by permanent magnet means for transfer to a different location or the like.

An important application resides in the lifting of a layer of cans or similar articles from a carton for transfer to a receiving station. Again it may be desirable to lift a layer of articles for transfer to a carton and release therein.

By the present invention it is possible to use permanent magnet means to transfer an array of articles having sufficient magnetizable material associated therewith. Filled cans of a wide range of sizes may be readily handled. A single layer of empty cans or the like may be lifted from a carton without disturbing subadjacent layers. The layer of cans may be discharged from the transfer apparatus in an array identical to that in which the cans were lifted directly at the bottom of a carton, for example. The transfer apparatus may occupy an area less than the area of the array of cans or the like being transferred so as to be readily inserted into confined spaces.

It is therefore an important object of the present invention to provide a transfer apparatus for transferring an array of individual articles effectively utilizing permanent magnet means as the retaining energy source for the articles during transfer.

A further object is to provide a highly effective permanent magnet transfer assembly capable of handling very heavy loads and yet which is simple, compact, and economical to manufacture.

Still another object of the invention is to provide a permanent magnet transfer assembly for an array of articles which does not require extra lateral clearance, thus making it possible to load or unload a carton by movement directly into the interior of the carton.

Yet another object of the invention is to provide a permanent magnet transfer apparatus having a strong and uniform but relatively shallow working field so as to adapt the apparatus to transfer of articles a single layer at a time from a multi-layer stack of such articles without disturbing subadjacent layers.

A still further object of the invention is to provide a novel release mechanism for permanent magnet transfer apparatus.

Another and further object of the invention is to provide a permanent magnet transfer apparatus particularly adapted to the transfer of containers of cylindrical or other configuration such as cans, but which is also applicable to solid cylindrical articles, solid blocks, flat plates and the like.

Another and still further object is to provide means for adjusting the strength of a permanent magnet transfer apparatus.

Other objects, features and advantages of the present invention will be more fully apparent from the following detailed description taken in connection with the accompanying drawings, in which.

As shown on the drawings.

Figures 1, 2:
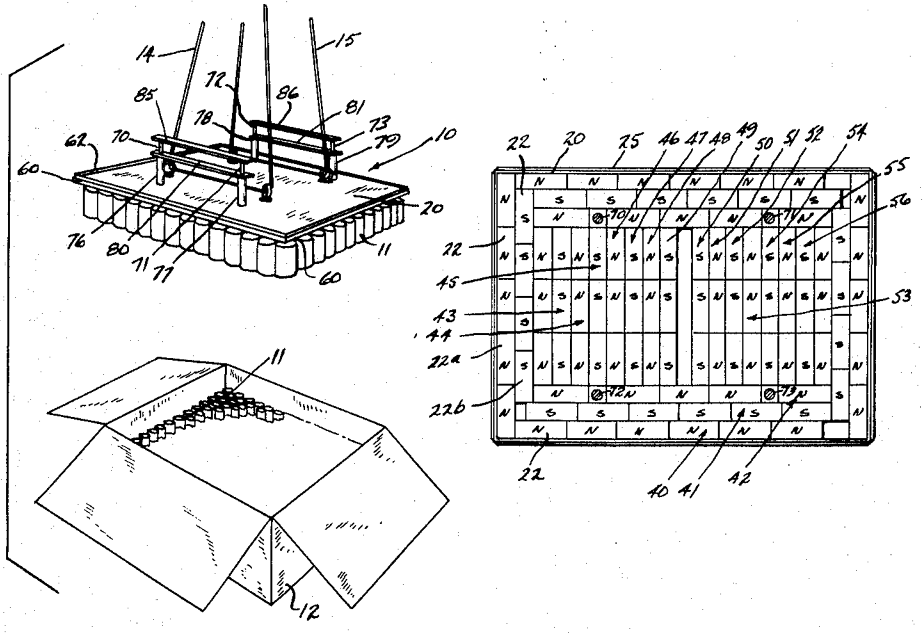
FIGURE 1 is a somewhat diagrammatic perspective view illustrating an embodiment of a permanent magnet transfer apparatus in accordance with the present invention for transferring cylindrical objects to and from a carton or the like in single layers.
FIGURE 2 is a diagrammatic bottom plan view illustrating a preferred arrangement of ceramic permanent magnet wafers in the apparatus of FIGURE 1, certain parts of the apparatus being omitted to show the magnet wafers more clearly.

Referring to FIGURE 1 there is illustrated a permanent magnet transfer assembly 10 for transferring single layers of articles such as hollow steel battery cases 11. By way of example, FIGURE 1 illustrates the situation where a carton 12 contains a series of layers of such battery cases 11 and it is desired to unload the cases from the carton 12 layer by layer. In the illustrated embodiment, the transfer assembly 10 may be carried by suitable means such as cables 14 and 15 from an overhead conveyor which is capable of being actuated to lower the assembly 10 into the carton 12 to receive a layer of articles and then to raise the assembly 10 above the carton 12 for horizontal movement to any desired location for further processing. In the embodiment illustrated in FIGURE 1, the outside overall dimensions of the layer of articles 11 being transferred exceeds the corresponding outside dimensions of the transfer assembly 10 so that the transfer assembly 10 will readily fit into the space occupied by the layer of articles.

Figure 3:
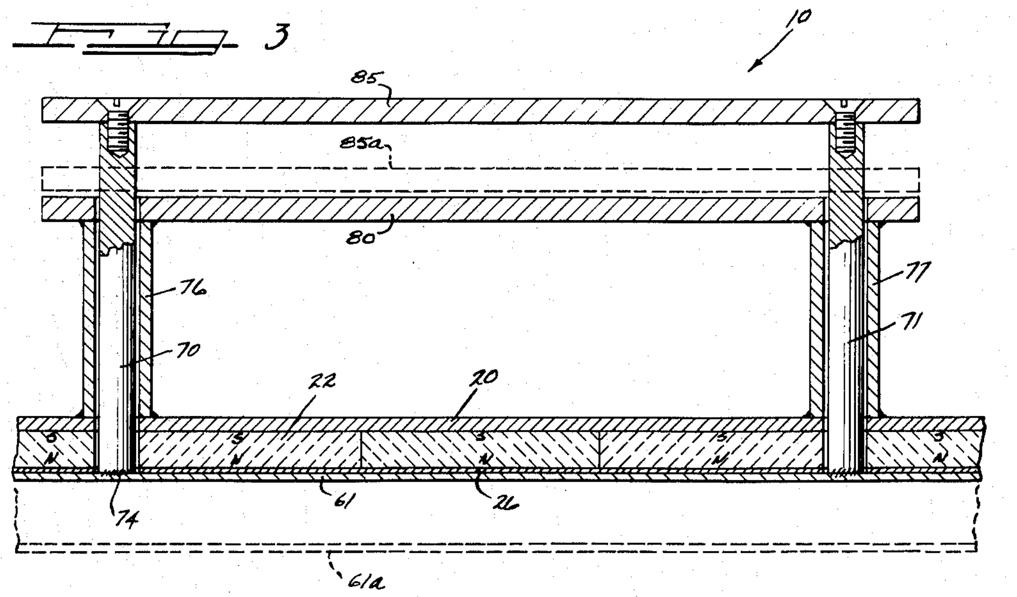
FIGURE 3 is an enlarged fragmentary vertical sectional view illustrating the details of the mechanism for releasing the articles from the transfer apparatus.
Figure 5:
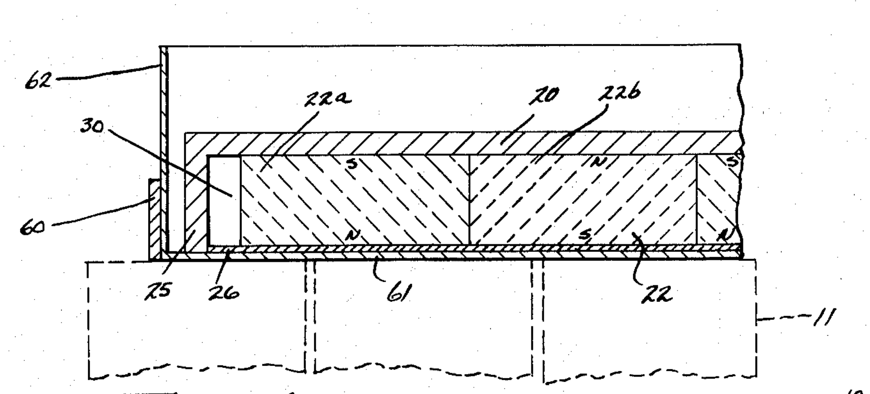
FIGURE 5 is an enlarged fragmentary vertical sectional view taken generally along the line V—V of FIGURE 4.

As best seen in FIGURE 3, the transfer assembly 10 may comprise a base plate 20 of magnetic material serving as a mounting means for a single layer of ceramic permanent magnet wafers 22. As seen in FIGURE 5, the base plate 20 has a downturned margin 25 which is suitably secured to a non-magnetic sheet 26 extending across the entire lower face of the layer of magnets 22. By way of example, the non-magnetic sheet 26 may be secured to the downturned margin 25 continuously about the rectangular perimeter of the sheet. As a specific example, the non-magnetic sheet 26 may have a rectangular configuration and a width dimension of 17⅜ inches and a length dimension of 24⅞ inches. The permanent magnet wafers are preferably of a ceramic permanent magnet material available under the trademark "Indox I" and have a width of 1.15 inches, a length of 3.29 inches and a thickness or height dimension of .375 inch. The sheet 26 may be of 18 gauge stainless steel and the base 20 and margin 25 may have a uniform thickness of ⅛ inch. A $^3/_{16}$ inch clearance gap is illustrated at 30 in FIGURE 5 between the outermost course of permanent magnet wafers indicated at 40 in FIGURE 4 and the adjacent interior surface of downturned margin 25 of base 20. The permanent magnet wafers may be suitably secured to the base 20 and to the sheet 26 and may be arranged generally as indicated in the top plan view thereof shown in FIGURE 4. By way of example, the magnet wafers may be cemented to both base 20 and sheet 26 with an epoxy resin.

Figure 4:
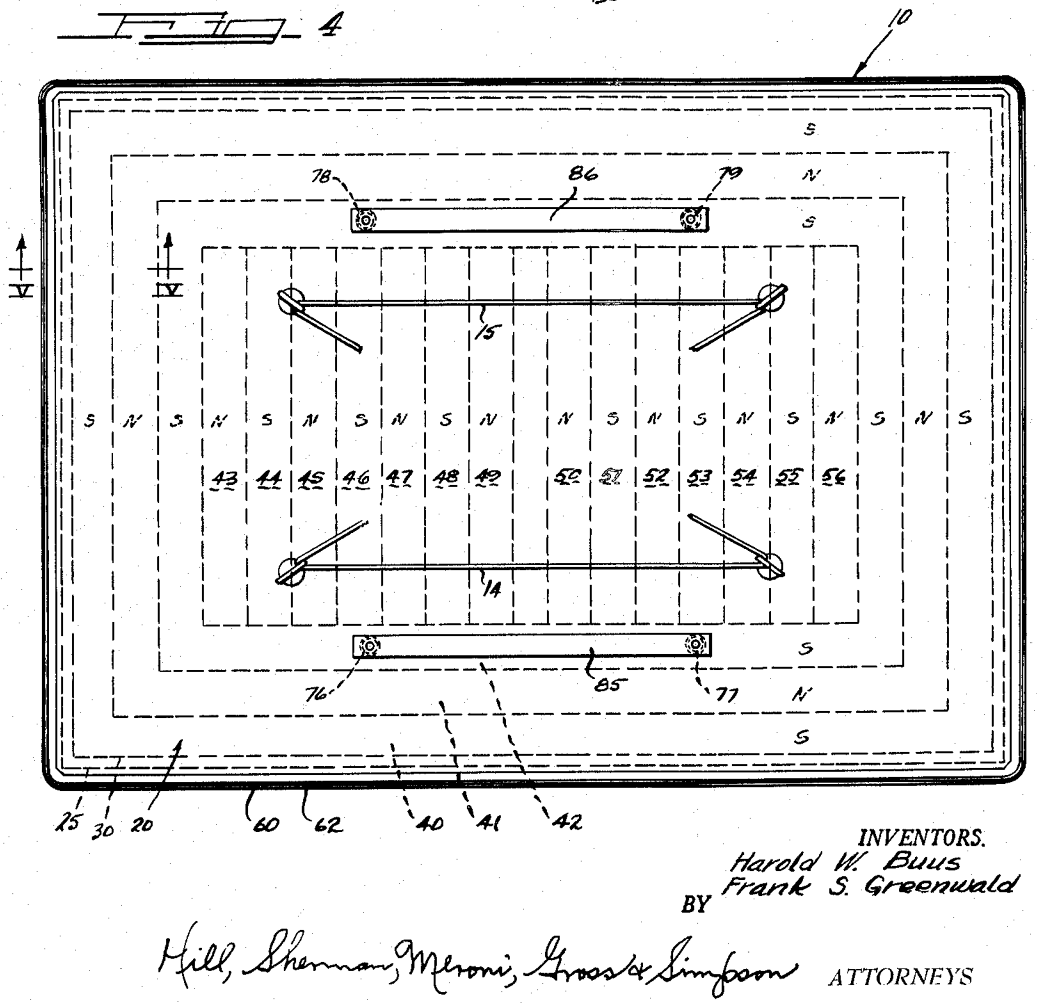
FIGURE 4 is a somewhat diagrammatic top plan view of the permanent magnet transfer apparatus of FIGURE 1.

It will be observed from FIGURE 4 that the magnets, which are magnetized through their thickness or vertical dimension as indicated in FIGURES 3 and 5, are preferably arranged so as to alternate in polarity over the face of the transfer assembly. Thus the outermost course of magnets which is indicated at 40 in FIGURES 2 and 4 and which extends about the entire outside perimeter of the array of magnets may have its north poles directed downwardly as indicated for the magnet wafer specifically designated 22*a* in FIGURE 5. The successive courses of magnets have been designated by reference numerals 41 throught 56 in FIGURES 2 and 4. It will be observed that courses 40, 42, 44, 46, 48, 51, 53 and 55 have their south poles directed upwardly and their north poles directed downwardly as indicated for magnet 22*a* in FIGURE 5, while courses 41, 43, 45, 47, 49, 50, 52, 54 and 56 have their north poles directed upwardly and their south poles directed downwardly as indicated for the magnet specifically designated 22*b* in FIGURE 5.

It will be observed from the bottom plan view of FIGURE 2 that a substantial majority of the wafers of one polarity have wafers of respectively opposite polarity at each side thereof. At the exterior course of magnets 40, an advantageous flux return path is provided by the downturned margin 25 as seen in FIGURE 5 and further by a piece of magnetic material 60.

A discharge sheet 61 is movable downwardly relative to the magnets to move the layer of articles outside of the effective holding field of the magnet layer. The discharge sheet 61 has an upturned marginal portion about about its perimeter indicated at 62 for rigidifying the discharge sheet 61 and laterally guiding and protecting the transfer assembly. By way of example, the strip 60 of magnetic material may extend about the entire rectangular perimeter of the sheet 61 as indicated in FIGURE 1 and may have a height dimension of ⅜ inch and be of 16 gauge magnetic steel. The sheet 61 may be of 18 gauge stainless steel and the upturned margin 62 may have a height dimension of 1 inch. The outside surface of margin 62 may be separated from the outside surface of downturned margin 25 by a distance of ¼ inch.

The discharge sheet 61 may have vertical shafts 70, 71, 72 and 73 of non-magnetic material secured thereto at their lower ends as indicated at 74 in FIGURE 3. The shafts extend upwardly through tubes 76, 77, 78 and 79 which are secured to base plate 20 as best seen in FIGURE 3. Cross bars 80 and 81 may extend between and be secured to respective pairs of tubes 76, 77 and 78, 79 and cross bars 85 and 86 may be suitably secured to the upper ends of shafts 70, 71 and 72, 73 respectively. When it is desired to discharge a layer of articles from the assembly, the bars 80 and 81 are squeezed toward the bars 85 and 86 until the bars 85 and 86 assume positions such as indicated at 85*a* in FIGURE 3 relative to the bars 80 and 81 to correspondingly relatively project the discharge sheet 61 to the position indicated at 61*a* in FIGURE 3. The spacing between the bars 80 and 85, and 81 and 86, is such as to provide a relative travel for the sheet 61 to move the articles out of the effective holding field of the magnet layer.

The magnetic characteristics of the ceramic permanent magnet material enable a magnetization through the short dimension of the wafers and provide a minimum flux shift to provide a blanket type magnetic field of narrow magnetic poles providing a very uniform magnetic holding field with individual magnetic attraction for each can or other article. While a manual type discharge for the articles has been specifically illustrated, lower operation of the discharge mechanism may be utilized. A manual discharge is particularly suitable for the handling of empty cans, for example, which are relatively light and may be held by means of a ⅜ inch thick ceramic permanent magnet layer.

The present invention also has important advantages in the handling of full cans which of course require a greater magnetic pull. By utilizing $^{11}/_{16}$ inch thick ceramic permanent magnet wafers of an oriented type available under the trademark "Indox V," a unit may be constructed capable of lifting virtually any size of can together with the contents thereof. In lifting full cans the total magnetic force is generally too great for a manual type of release. For this operation, a spring assisted type of release may be utilized. As an example, a magnet having a magnetic face area of 18 inches by 16 inches would have a net weight of approximately 70 pounds. A total load of full cans to cover this area would have a total weight of approximately 46 pounds, for example. The total magnetic pull upon this area of cans would be approximately 108 pounds, leaving a net pull of 62 pounds upwardly on the cans. In engaging with the cans, the weight of the magnet plus the magnetic pull may be utilized to overcome the opposing force of the compression springs which are interposed between the magnet assembly and the non-magnetic discharge plate such as indicated at 61 in FIGURE 3. With the magnets in holding position, a locking handle is rotated to the position locking the discharge plate such as 61 next to the face sheet 26 of the magnet and locking the springs in compressed condition. The assembly is then ready to lift and transfer the layer of cans from its table or support. When the load of cans has been transported to the position desired for discharge and set down upon a supporting surface, the discharge plate locking handle is rotated to the release position allowing the compressed springs to act. The hoist or suspension such as partially indicated at 14 and 15 in FIGURE 1 lifts the magnet assembly, allowing the force of the compressed springs, which is greater than the net magnetic pull to push downward upon the discharge plate and the layer of cans, leaving the cans deposited upon the surface while the magnet is lifted away. For this action, the total compressed force of the springs must of course be less than the weight of the magnet plus the total magnetic pull, which in this case would be 178 pounds. The compression force of the springs, however, must be greater than the net pull of the magnet which would be 62 pounds. Screw thread means may be utilized, for example, for controlling the amount of compression of the discharge springs and thus enabling adjustment of the discharge mechanism for varying load weights and magnetic pulls.

Of course, an electromagnet type locking device may be utilized for locking the compressed springs in their compressed condition rather than a manually operated handle. This enables remote control of the transfer mechanism. Alternatively, a compressed air cylinder may be utilized to apply the force for movement of discharge plate 61 to a position such as indicated at 61*a* in FIGURE 3. For example, the air cylinder may be fixed to the back plate 20 of the magnet with the shaft of the piston fastened to cross arms which in turn are fastened to studs such as 70–73 passing through the magnet and into engagement with the discharge plate 61, FIGURE 3. By actuating the air cylinder, force is exerted downwardly upon the studs 70–73 to move the discharge plate to a positon such as indicated at 61*a* to discharge a load of articles from the apparatus.

As another example of a discharge mechanism, a linkage mechanism may be provided so that in lifting a load, the lifting force would be exerted through the studs such as 70–73 and the discharge plate 61 thereby providing full magnetic holding power for the lifting action. After the magnet and load is set down for discharge, the suspension for the assembly is changed from a suspension connected to the discharge plate 61 to a suspension connected through the linkage so that when a lifting force is exerted on the linkage, a reaction force is exerted through the shafts 70–73 in the downward direction. Thus, when the lifting force is exerted through the linkage, the weight of the magnet is added to the weight of the load in the downward direction and if greater than the net magnetic pull, will cause discharge of the articles. This method will provide discharge so long as one-half of the weight of the magnet plus the weight of the load exceeds one-half of the magnetic pull. With the weights and magnetic pulls previously given, this further example would also be operative.

A given design of transfer apparatus in accordance with the present invention may be made adjustable to handle varying loads or layer thicknesses within a limited range. For example, with a lighter load at a reduced layer thickness, means could be provided for positioning the discharge plate 61 at a slightly greater distance from the plate 26 in its lifting position. For example, a metal band could be wrapped about the bars 80, 85 and another band about the bars 81, 86 which would hold the bars slightly closer together than illustrated in FIGURE 1 to introduce a slight spacing of discharge plate 61 from cover sheet 26. The bands could be of an open rectangular loop configuration so as to allow the bars to be manually pressed together for discharge of the load. Other means of adjusting the applied holding strength to the articles will be apparent from the foregoing description.

By utilizing ceramic permanent magnet slabs as described, a field is provided which is strong and uniform but shallow in depth. This feature is especially advantageous where it is desirable to lift single layers of relatively thin dimension from a stack without disturbing the other layers. The magnet apparatus of this invention is ideally suited for the handling of cans—full or empty. The flexibility of the unit's design permits a wide variety of features to fit individual requirements more exactly. Since it is possible to employ an adjusting mechanism which will vary the magnetic field exerted on the articles to be transferred, a single transfer assembly can handle a number of jobs that might otherwise require several different magnets.

While a specific illustrative embodiment has been given and various representative dimensions and the like have been mentioned, it will be apparent that the apparatus may take many different shapes and utilize many different sizes and shapes of permanent magnet units depending on the particular job for which the apparatus is to be utilized. Broadly speaking it will be noted that the bars 80, 85, and 81, 86 themselves provide means for adjusting the strength of the holding field of a given unit, since a desired spacing of the discharge plate 61 from the cover sheet 26 may be introduced by manually squeezing the bars together slightly. Thus, the desired number of layers to be lifted by a given magnet assembly may be manually adjusted during the lifting process by adjusting the spacing of bars 80, 85 and 81, 86.

*Summary of operation of the embodiment of FIGURES 1–5*

In operation of the apparatus, a suitable conveyor means transports the unloaded transfer apparatus by means of cables 14 and 15 into a position over a carton such as indicated at 12 in FIGURE 1. The conveyor apparatus may be adapted to lower the transfer apparatus 10 into engagement with the top layer of articles 11 in the carton.

As the apparatus is lowered toward the articles, the discharge sheet 61 will be in its projected position indicated at 61*a* in the illustrated embodiment. When the discharge sheet engages the top layer of articles, continued lowering of the cables 14 and 15 will cause the cover sheet 26 to move toward the discharge plate 61. When the discharge plate 61 is in the desired spacial relation to the cover sheet 26, for example, in contacting relation as indicated in FIGURE 3, the articles will be within the effective holding field of the magnets 22 and will be retained with the assembly 10 when the same is lifted and transferred horizontally to a desired station.

The thicknes of the magnet wafers 22 is selected so as to provide an effective holding magnetic field of depth to lift only the desired number of layers of articles, for example, a single layer as indicated in FIGURE 1 without disturbing subadjacent layers of articles such as those remaining in the carton 12 in FIGURE 1. Where heavier full cans are to be lifted, the thickness of the magnets 22 may be increased, and a ceramic permanent magnet material may be utilized which is oriented in the thickness direction. With increasing strength of the working magnetic field, it may be necessary to provide power operated means for releasing the articles from the transfer apparatus.

In discharging the articles from the apparatus, the articles may first be lowered to the desired supporting surface by means of cables 14 and 15, after which the cooperating pairs of bars or handles 80, 85 and 81, 86 may be squeezed together by manual or power means to relatively move the articles out of the effective holding field of the permanent magnet units. In the instance just given, the magnets 22 would be raised relative to the discharge plate 61 by moving the bars 80 and 81 upwardly into proximity to the bars 85 and 86. In this case, the discharge plate 61 would remain contacting the top of the layer of articles being discharged.

It has been found highly advantageous to provide courses of permanent magnet units of the same polarity in alternate concentric rings as indicated at 40, 41 and 42 in FIGURE 4 near the outside perimeter of the apparatus. This configuration provides an effective holding force for the cans at the outer perimeter of an array to be transferred, particularly when a magnetic flux return path is provided such as indicated at 60 and 25 in FIGURE 5 outwardly of the outermost course of permanent magnets.

It will be apparent that many modifications and variations may be effected and that dimensions and the like will be selected depending on the particular application intended. The particular dimensions and other numerical examples given herein are given by way of preferred example and not by way of limitation. The term "magnetizable articles" as used in the claims is intended to cover all configurations of articles having sufficient magnetic material associated therewith to be lifted by permanent magnets. The articles can, of course, have any configuration including hollow cylindrical, solid cylindrical, solid block or flat plate, for example. Either the container or the contents may furnish the required magnetic material for rendering the transfer apparatus of the present invention operative thereon.

Figure 6:
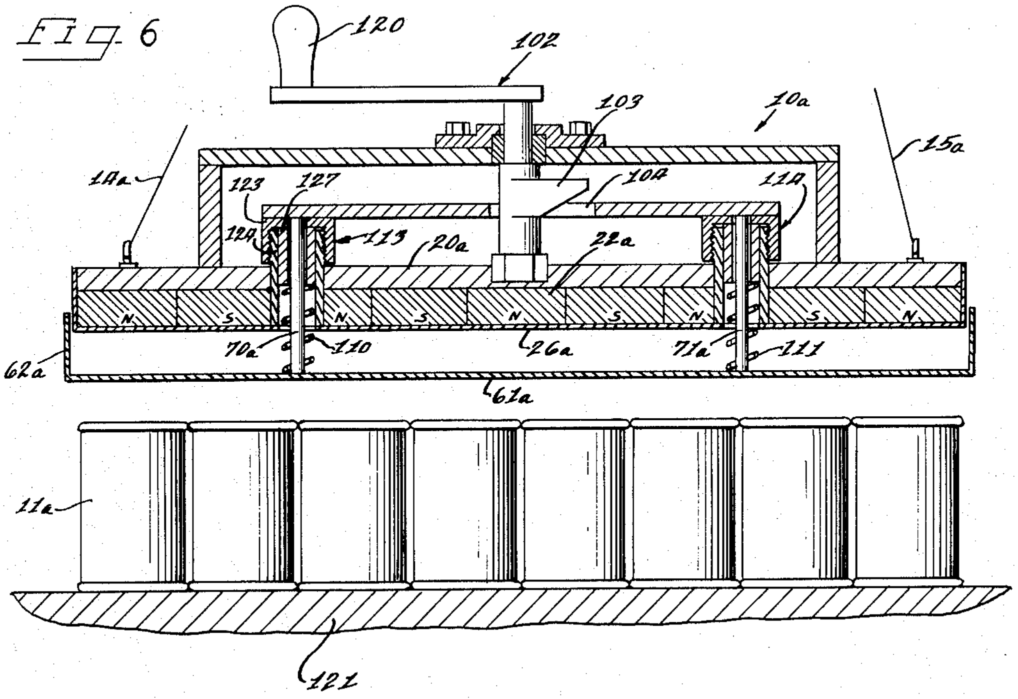
FIGURE 6 is a somewhat diagrammatic vertical sectional view of a further embodiment of a permanent magnet transfer apparatus in accordance with the present invention showing the position of the release mechanism prior to engagement with an array of articles.
Figure 7:
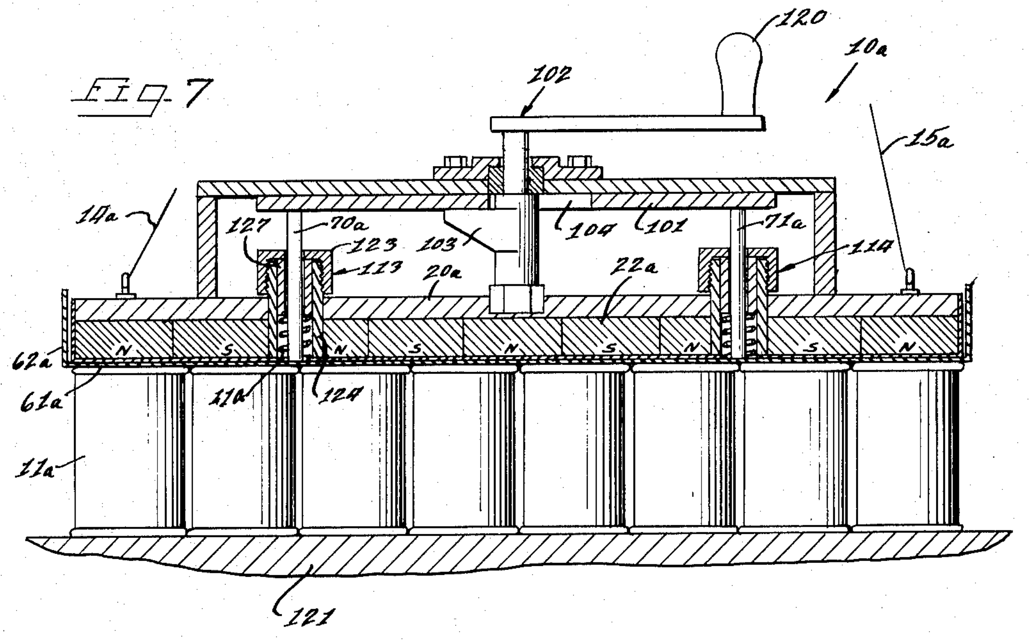
FIGURE 7 is a vertical sectional view similar to FIGURE 6 but showing the permanent magnet transfer apparatus in operative association with a layer of articles to be transferred.

In the embodiment of FIGURES 6 and 7, parts similar to those shown in FIGURES 1 and 2 have been designated by the same reference numeral followed by the letter *a* so that a detailed description thereof is believed unnecessary. As shown in FIGURE 6, a discharge plate 61*a* is secured to four vertical shafts such as 70*a* and 71*a* which are carried by a common plate 101 cooperating with a locking mechanism 102. With locking lug 103 of locking mechanism 102 in alignment with a cooperating slot 104 in plate 101, compression springs 110 and 111 hold the discharge plate 61 in an extended position in spaced relation to the cover sheet 26*a* of the magnets 22*a*. Movement of the discharge plate 61*a* is limited by contact of the plate 101 with the upper ends of sleeve assemblies 113 and 114 which are secured to the base 20*a* of magnetic material.

With the transfer apparatus 10*a* lowered until the discharge plate 61*a* rests on the layer of articles 11*a* to be transferred, the weight of the transfer apparatus exclusive of the discharge plate 61*a* serves to tend to compress the springs 110 and 111. As an example, a magnet having a magnet face area of 18 inches by 16 inches might have a net weight of approximately 70 pounds. A load of full cans to cover this area might have a total weight of approximately 46 pounds, for example. The total magnetic pull upon this area of cans would be approximately 108 pounds for relatively thick ceramic permanent magnet wafers of an oriented type available under the trademark "Indox V." In engaging with the cans, the weight of the magnet plus the magnetic pull thereof is utilized to overcome the opposing force of the compression spring such as 110 and 111 which are interposed between the magnet assembly and the non-magnetic discharge plate 61*a*. With the magnets in holding position, locking handle 120 of locking assembly 102 is rotated to the position shown in FIGURE 7 locking the discharge plate 61*a* next to the cover sheet 26*a* and locking the springs such as 110 and 111 in compressed condition. The assembly is then ready to lift and transfer the layer of cans from its table or support indicated generally at 121.

When the load of cans has been transported to the position desired for discharge and set down upon a supporting surface, the discharge plate locking handle 120 is rotated to the release position shown in FIGURE 6 allowing the compressed springs 110 and 111 to act. The hoist or suspension such as partially indicated at 14*a* and 15*a* lifts the magnet assembly, allowing the force of the compressed springs which is greater than the net magnetic pull to push downward upon the discharge plate 61*a* and the layer of cans 11*a*, leaving the cans deposited on the surface while the magnet is lifted away.

For proper operation, the total compressed force of the springs must of course be less than the weight of the magnet plus the total magnetic pull, which in this case would be 178 pounds. The compression force of the springs, however, must be greater than the net pull of the magnet (total magnetic pull less the weight of the cans) which would be 62 pounds.

Screw thread means such as cap members 123 threaded onto the fixed sleeves 124, for example, may be utilized for controlling the amount of compression of the discharge springs 110 and 111, thus enabling adjustment of the discharge mechanism for varying load weights and magnetic pulls. A freely movable force transmitting sleeve 127 is illustrated as being movably disposed within the fixed sleeve 124 and having its position controlled by the threaded cap 123 to control the compression of the springs 110 and 111.

Simply by way of illustrative example, the compression force of the springs may be adjusted to be approximately 65 pounds in the condition of the transfer apparatus illustrated in FIGURE 7. The variation in magnet force and spring force as the gap between the discharge plate 61*a* and the cover 26*a* varies from that shown in FIGURE 6 to that shown in FIGURE 7 is summarized in the following table:

| Gap (Inches) | Weight Magnet (Pounds) | Magnet Pull (Pounds) | Total Force (Pounds) | Spring Force (Pounds) |
|---|---|---|---|---|
| ½ | 70 | 1 | 71 | 0 |
| 7/16 | 70 | 2 | 72 | 9 |
| ⅜ | 70 | 3 | 73 | 19 |
| 5/16 | 70 | 4 | 74 | 27 |
| ¼ | 70 | 7 | 77 | 37 |
| 3/16 | 70 | 12 | 82 | 46 |
| ⅛ | 70 | 27 | 97 | 56 |
| 1/16 | 70 | 108 | 178 | 65 |

For the above example, the ultimate spring force can, of course, be greater than 65 pounds, providing that at any of the successive gap distances, the total force (magnet pull plus weight of transfer assembly) will exceed the spring force.

Figure 8:
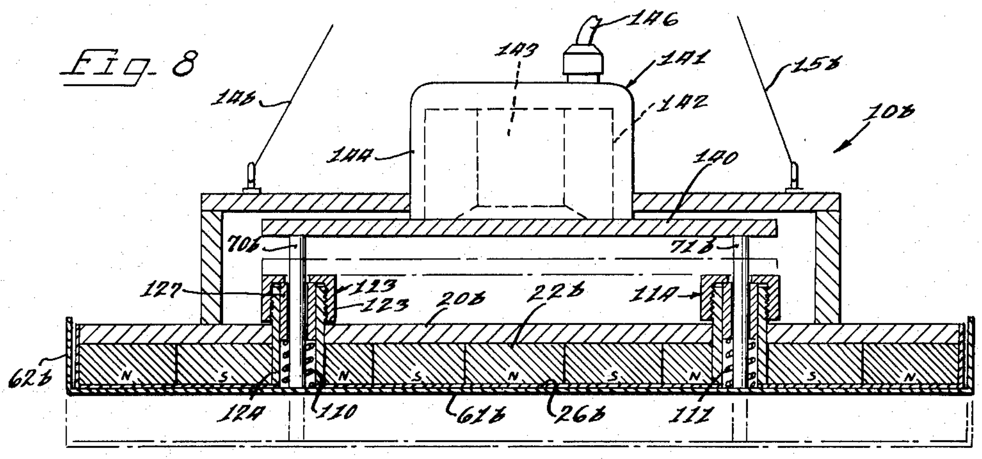
FIGURE 8 illustrates a further modified permanent magnet transfer apparatus in accordance with the present invention.

FIGURE 8 illustrates a further embodiment wherein parts corresponding to those illustrated in FIGURES 1 and 2 have been given the same reference numerals followed by the letter *b* and other parts which are substantially identical to those in FIGURES 6 and 7 have been given the same reference numeral.

In the embodiment of FIGURE 8, a solid plate of magnetic material 140 is secured to the upper ends of the four vertically movable shafts such as 70*b* and 71*b* so that the discharge plate 61*b* may be locked in its retracted position corresponding to the retracted position shown in FIGURE 7 by means of an electrically energized solenoid device 141 including a winding 142, a central magnet core 143 and a magnetic casing 144 providing an annular return path. A suitable flexible cable 146 may supply suitable unidirectional current to the winding 142 for locking the movable magnetic plate 140 in the position shown in FIGURE 8. This enables remote control of the transfer mechanism.

As in the embodiment of FIGURES 6 and 7, in engaging the transfer apparatus with the cans, the weight of the magnet plus the magnetic pull is utilized to overcome the opposing force of the compression springs 110 and 111. With the magnets in holding position, the locking solenoid 141 is energized locking the discharge plate 616 adjacent the cover sheet 26*d* of the magnet and locking the springs 110 and 111 in the compressed condition. The assembly is then ready to lift and transfer the layer of cans from its table or support.

When the load of cans has been transported to the position desired for discharge and set down upon a supporting surface, the solenoid locking device 141 is deenergized allowing the compressed springs 110 and 111 to act. The hoist or suspension such as partially indicated at 14*b* and 15*b* lifts the magnet assembly, allowing the force of the compressed springs which is greater than the net magnetic pull to push downward upon the discharge plate 61*d* and the layer of cans, leaving the cans deposited upon the surface while the magnet is lifted away. The relationship of the force of the compressed springs to the magnetic pull may be as given in the foregoing table, for example.

Figure 9:
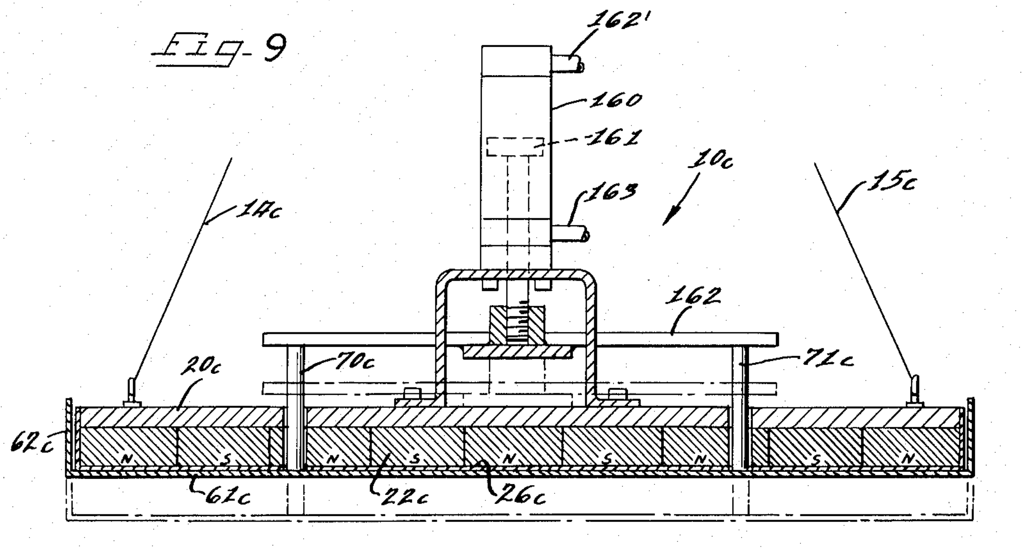
FIGURE 9 is a somewhat diagrammatic vertical sectional view illustrating a further modification wherein fluid pressure means is utilized for releasing articles from the transfer apparatus.

FIGURE 9 illustrates a further embodiment wherein parts similar to those in FIGURES 1 and 2 have been given the same reference numeral followed by the letter *c*. In the embodiment of FIGURE 9, a compressed air cylinder 160 is mounted in fixed relation to the base 20*c* of magnetic material and has its piston diagrammatically indicated at 161 coupled to movable arms 162 which are secured to respective pairs of vertically movable shafts such as 70*c* and 71*c*. By actuating the air cylinder, force is exerted downwardly upon the shafts such as 70*c* and 71*c* to move the discharge plate 61*c* to a position such as indicated in dot dash outline to discharge a load of articles from the apparatus. Air pressure lines are diagrammatically indicated at 162 and 163 for selectively supplying pressure to the actuating chambers on opposite sides of the piston head 161.

Figure 10:
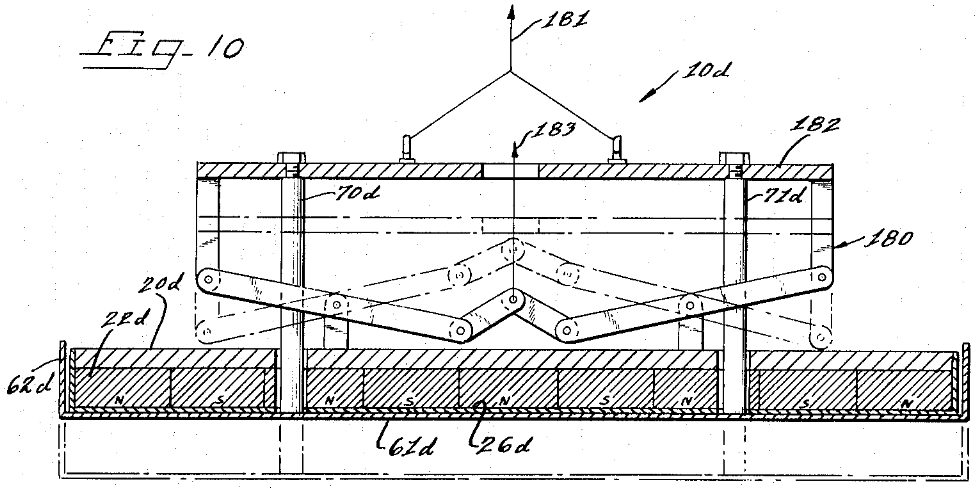
FIGURE 10 is a somewhat diagrammatic vertical sectional view of a transfer apparatus utilizing a linkage arrangement for facilitating release of articles from the transfer apparatus.

FIGURE 10 illustrates another example of a discharge mechanism wherein a linkage mechanism 180 may be provided so that in lifting a load, the lifting force is exerted through four shafts such as 70*d* and 71*d* and the discharge plate 61*d* thereby providing full magnetic holding power for the lifting action. For example, the lifting force would be applied to the cable indicated at 181 which is secured to a plate 182 carrying the shafts such as 70*d* and 71*d*.

After the magnet and load is set down for discharge, the suspension for the assembly is changed from a suspension connected to the discharge plate 61 to a suspension connected to the linkage 180 so that when a lifting force is exerted on the linkage through cable 183, a reaction force is exerted through the shafts such as 70*d* and 71*d* in the downward direction. Thus, when the lifting force is exerted through the linkage 180, the weight of the magnet is added to the weight of the load in the downward direction and if greater than the magnetic pull, will cause discharge of the articles. This method will provide discharge so long as one-half the weight of the magnet plus the weight of the load exceeds one-half of the magnetic pull. With the weights and magnetic pulls previously given, this further example would also be operative.

It will be apparent that many modifications and variations may be effected. The dimensions and the like will be selected depending on the particular application intended. The particular dimensions and other numerical examples given herein are given by way of preferred example and not by way of limitation. The articles to be transferred can, of course, have any configuration including hollow cylindrical, solid cylindrical, solid block or flat plate, for example. Either the container or the contents may furnish the required magnetic material for rendering the transfer apparatus of the present invention operative thereon.

The embodiment of FIGURES 11 through 16 represents a transfer apparatus particularly useful in transferring relatively heavy articles such as full cans up to the No. 10 can size.

The illustrated apparatus comprises a pair of fixed rails 210 and 211 for supporting the magnetic transfer apparatus 212 during horizontal movement of the apparatus, for example, in transferring a layer of articles associated with the transfer assembly 213. The transfer apparatus includes a horizontal plate 215 having rollers such as indicated at 216 and 217 cooperating with the lower flanges of rails 210 and 211. The transfer assembly 213 is coupled with the plate 215 by means of scissor linkages 220 and 221 for damping horizontal travel of the assembly 213 relative to the plate 215.

A suitable vertical actuating mechanism is indicated at 223 comprising a fixed part 224 secured to the plate 215 and a movable part 225 secured to the transfer assembly 213. The actuating device may be a hydraulic cylinder hoist as indicated or an electric hoist.

Figures 11, 12, 13, 14:
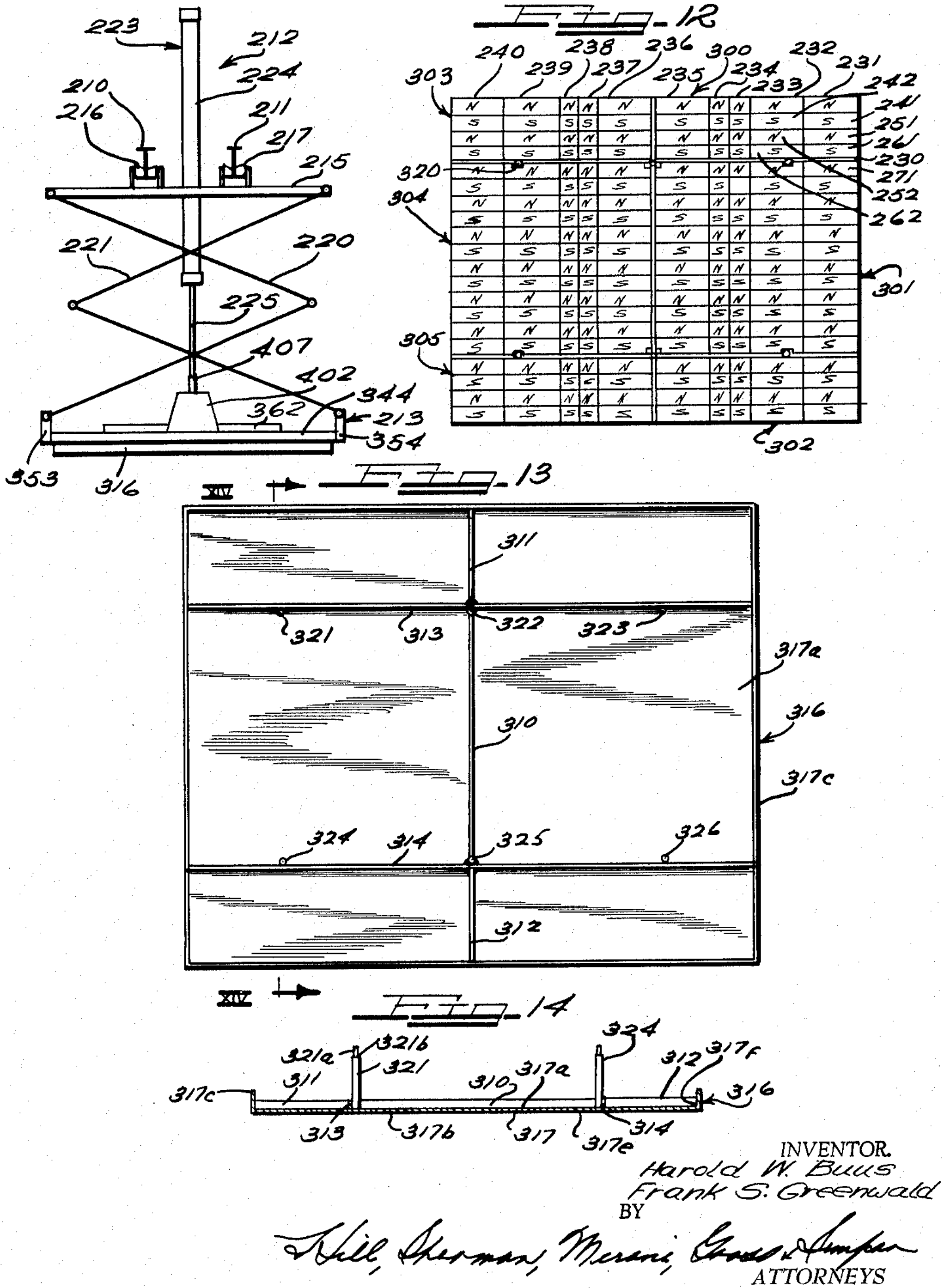
FIGURE 11 is somewhat diagrammatic elevational view of a further embodiment in accordance with the present invention.
FIGURE 12 is a somewhat diagrammatic bottom plan view of the permanent magnet subassembly of the device of FIGURE 11.
FIGURE 13 is a top plan view of the discharge plan which cooperates with the permanent magnet subassembly of FIGURE 12.
FIGURE 14 is a vertical sectional view taken generally along the line XIV—XIV of FIGURE 13.
Figure 16:
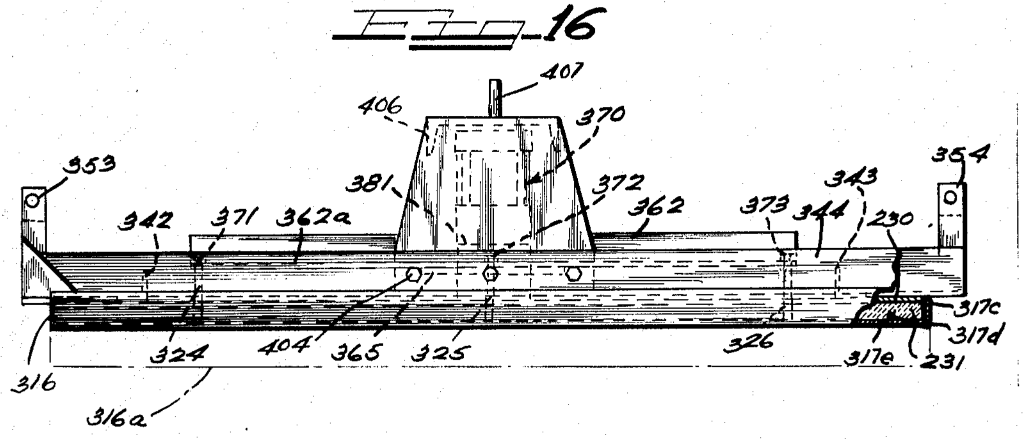
FIGURE 16 is a side elevational view of the assembly of FIGURE 15 with a right-hand portion thereof broken away and in section to show details of construction.

The magnet assembly 213 comprises a backing plate 230 having a coextensive layer of permanent magnets such as indicated at 231 as indicated in FIGURES 12 and 16. The magnets 231 are of ceramic permanent magnet material as in the previous embodiments and are magnetized through their thickness dimension which is the direction at right angles to the plane of plate 230. Thus magnet 231 shown in FIGURE 16 has a south magnetic pole adjacent plate 230 and a north magnetic pole at its lower face which is the face seen in FIGURE 12. The magnets are shown as being arranged in rows of successively opposite polarity. Thus the row of magnets 231–240 have their lower faces of north magnetic polarity, while the next row including magnets 241 and 242 has lower faces of south magnetic polarity. An array or group of permanent magnet units such as indicated at 231, 232, 241, 242, 251, 252 and 261, 262 are of the same identical size and are in contact with each other and are in close proximity with magnets such as indicated at 71 of adjacent groups or arrays. The permanent magnets are arranged in sections designated generally by the reference numerals 300–305 which together with the backing plate 230 form the permanent magnet subassembly. The sections 300–305 while being in close proximity with adjacent sections have slight spaces therebetween defining channels for receiving reinforcing ribs 310–314 of a discharge pan subassembly 316 of non-magnetic material. The height of the ribs 310–314 is such that the upper face 317*a* of plate 317 of the discharge subassembly 316 is movable into close relationship to the undersurface of the permanent magnet subassembly which is the surface viewed in FIGURE 12.

As indicated somewhat diagrammatically in FIGURE 12, the backing plate 230 of the permanet magnet subassembly of FIGURE 12 is provided with a series of six holes such as indicate at 320 which are adapted to receive respective studs 321–326 of the discharge pan subassembly 316. The studs 321–326 may be of non-magnetic material.

For the specific application contemplated in the present embodiment, the undersurface 317*b* of discharge plate 317 must be flat within plus or minus $\frac{1}{16}$ inch. The reinforcing bars 310–314 together with the upstanding marginal flange 317*c* provide the necessary rigidity of the discharge pan subassembly which prevents substantial tilting of the articles of an array being transferred, relative to each other.

Figure 15:
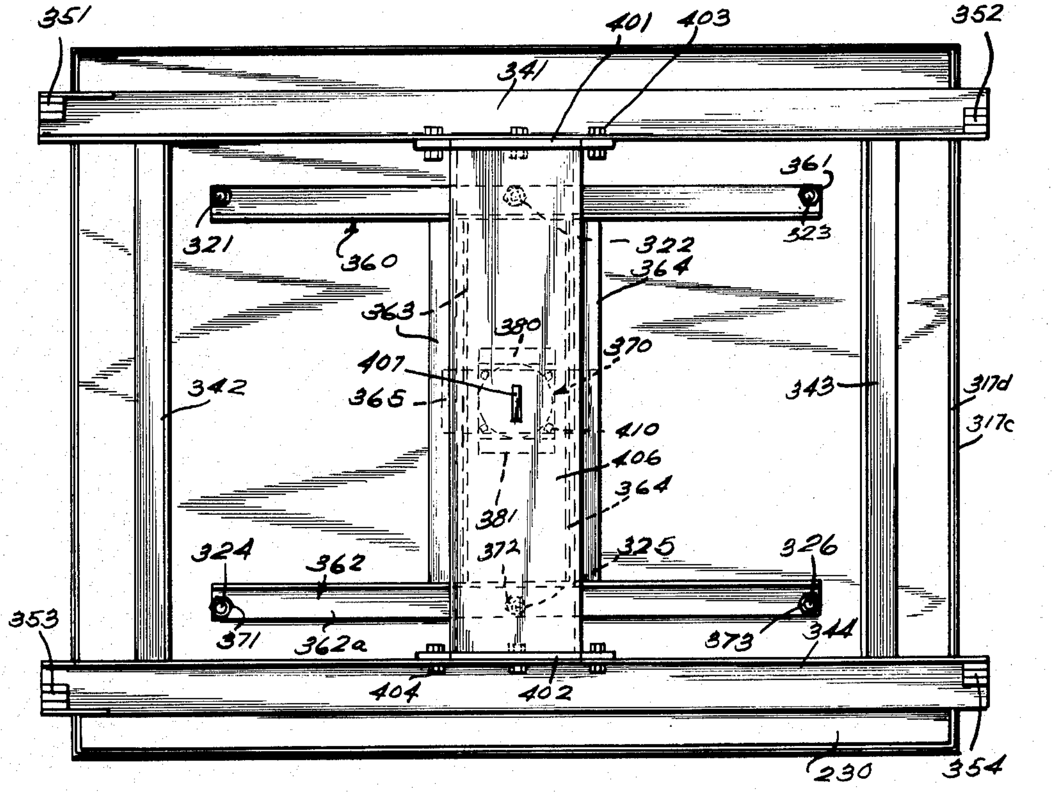
FIGURE 15 is a somewhat diagrammatic top plan view of the complete magnetic transfer assembly of the device of FIGURE 11.

Referring to FIGURES 15 and 16, it will be observed that the plate 317 is provided with a curved marginal portion 317*d* about its perimeter joining the flat plate portion 317*e* with the marginal flange 317*c*. By way of example, the portion 317*d* may be formed with an inside radius of $\frac{1}{16}$ inch as indicated at 317*f* in FIGURE 14.

In the particular application contemplated in the illustrated embodiment, the backing plate 230 which is of magnetic material is to be flat within plus or minus $\frac{1}{32}$ inch. To provide the required rigidity, reinforcing bars 341–344 are secured to the upper surface of the plate 230. By way of example where the plate is to support permanent magnet units having a vertical or thickness dimension of about one inch, the backing plate should have a thickness dimension of approximately $\frac{3}{8}$ inch. The backing plate 230 may be formed of hot rolled steel to provide a good magnetic return path at the inactive faces of the magnets. The flux paths for adjacent magnets such as 231 and 241 of opposite polarity may be thought of as extending from the lower north face of magnet unit 231 through the article being held to the south polarity lower face of magnet unit 241 and from the upper north polarity face of magnet unit 241 through the adjacent portion of the backing plate 230 to the south polarity upper face of magnet unit 231. The rigidifying means including angle bars 341–344 is sufficient to prevent substantial deflection of the active face of the magnet subassembly from the required substantially planar condition.

The outer ends of angle bars 341 and 344 are provided with brackets 351–354 to which the lower ends of scissor linkages 220 and 221, FIGURE 11, are secured.

As seen in FIGURES 15 and 16, the upper ends of studs 321–326 associated with the discharge pan subassembly 316, FIGURES 13 and 14, are secured to an actuating frame 360 by means of nuts such as indicated at 371 engaging the threaded end such as indicated at 321*a*, FIGURE 14, of the studs. The frame 360 comprises members 361–365. The angle bars 361–362 rest against the shoulders such as indicated at 321*b* in FIGURE 14 of the stud 321 so that driving of the frame 360 vertically downwardly by means of an actuating assembly such as indicated at 370 will drive the discharge pan subassembly 316 downwardly to a position such as indicated at 316a in FIGURE 16 to disengage an array of articles from the transfer assembly. The nuts on studs 324, 325 and 326 have been designated by the reference numerals 371–373 to facilitate understanding of FIGURE 16. Similarly, the horizontal part of angle piece 362 has been designated 362a in FIGURE 16.

The plate 365 is secured to the undersurfaces of angle bars 363 and 364 as indicated in FIGURE 16. The plate 365 extends between a pair of plates 380 and 381 secured to the upper surface of backing plate 230. Thus, the plate 365 moves in the vertical direction in the space between plates 380 and 381 when actuating device 370 is energized. The plate 365 may have a central aperture to which the actuating rod of the actuating device 370 may be secured. The backing plate 230 may be apertured if required to provide clearance for the required stroke of the actuating rod of the device 370. By way of example, the actuating device 370 may comprise an air cylinder of four inch diameter and two inch stroke for the contemplated application previously mentioned for the illustrated embodiment.

The vertical parts of angle bars 341 and 344 may have upstanding plates 401 and 402 secured thereto by suitable fastening means such as indicated at 403 and 404. The plates may have a channel member 406 extending therebetween carrying an eye bracket 407 to which the lower end of movable actuator member 225, FIGURE 11, may be secured. The air cylinder 370 may have its casing secured to channel 406 as indicated at 410 in FIGURE 15 and/or secured to the upper faces of plates 380 and 381. These parts are all fixed relative to the backing plate 230.

The ⅜ inch thick backing plate 230 is used with "Indox V" ceramic permanent magnet material, one inch thick, primarily to provide sufficient steel cross section for the flux density of these relatively larger magnet units. This is compared to a ⅛ inch thick plate, for example, for the embodiment of FIGURES 1–5 where ⅜ inch thick "Indox I" ceramic permanent magnet units are employed for lifting empty cans.

The reinforcing angles 341–344 and the reinforcing ribs 310–314 on the stainless steel discharge pan 317 are both vitally important to the performance of the larger area units, for example, having an active magnet face with an area corresponding to a width dimension of approximately 42 inches and a length dimension of approximately 53 inches. Because of the relatively shallow magnetic field to be provided in accordance with the concepts of the present invention it is necessary that both the magnet structure of FIGURE 12 and the pan of FIGURES 13 and 14 be substantially flat and free of distortion so that the pan 317, in lift position, is in its closest proximity to the active face of the magnet assembly over the total area of the magnet assembly for uniform lift. By way of example for the dimensions previously discussed of the other components, angle members 341–344 may have a cross section ¼ inch thick and 3 inches on each side. The reinforcing ribs or bars 310–314 may have a thickness of ⅛ inch and a height dimension of ½ inch. The studs 321–326 may have ½ inch diameter and the marginal flange 317c may have a height of 2 inches.

One significant application for the embodiment of FIGURES 11–16 is in palletizing with larger full cans. The specific dimensional example given is suitable for full cans up to the No. 10 can size.

In each of the illustrated embodiments, for optimum results, both the magnet structure and the discharge plate should be substantially flat and free of distortion by the utilization of a sufficient thickness of metal, reinforcing marginal flanges and reinforcing bars as illustrated.

The specific dimensional example given with respect to the embodiment of FIGURES 11–16 is given by way of example and not of limitation. It is considered that the giving of specific dimensions for a practical application will assist those skilled in the art in adapting the invention to various circumstances.

It will be apparent that many further modifications and variations may be effected without departing from the scope of the novel concepts of the present invention.

We claim as our invention:

1. A permanent magnet article transfer assembly comprising
   (a) permanent magnet supporting means, and
   (b) an array of permanent magnet units carried by said supporting means for conjoint movement therewith,
   (c) said units being magnetized through a thickness dimension thereof to provide a working magnetic field at at least one side of said array for holding magnetizable articles at said one side of said array for transfer movement therewith,
   (d) said permanent magnet units being of substantially identical cross sectional dimensions transversely of said thickness dimension and being substantially in engagement with laterally adjacent units to provide a compact assembly and having substantially flat active faces defining said working magnetic field which lie substantially in a common plane for uniform spacial relationship to an array of articles to be held thereby, and
   (e) said array of permanent magnet units comprising a series of permanent magnet wafers of thickness less than one inch.

2. A permanent magnet article transfer assembly comprising
   (a) permanent magnet supporting means, and
   (b) an array of permanent magnet units carried by said supporting means for conjoint movement therewith,
   (c) said units being magnetized through a thickness dimension thereof to provide a working magnetic field at at least one side of said array for holding magnetizable articles at said one side of said array for transfer movement therewith,
   (d) said permanent magnet units being of substantially identical cross sectional dimensions transversely of said thickness dimension and having close lateral proximity to adjacent units to provide a compact assembly and having substantially flat active faces defining said working magnetc field which lie substantially in a common plane for uniform spacial relationship to an array of articles to be held thereby,
   (e) said permanent magnet units being arranged in sources and the magnet units of adjacent courses generally having opposite polarity, and
   (f) the permanent magnet units of the outermost course at the perimeter of said array having the same polarity of magnetization.

3. A permanent magnet article transfer assembly comprising
   (a) permanent magnet supporting means,
   (b) an array of permanent magnet units of ceramic permanent magnet material carried by said supporting means for conjoint movement therewith,
   (c) said units being magnetized through a thickness dimension thereof to provide a working magnetic field at at least one side of said array for holding magnetizable articles at said one side of said array for transfer movement therewith,
   (d) said permanent magnet units being of substantially identical cross sectional dimensions transversely of said thickness dimension and having close lateral proximity to adjacent units to provide a compact assembly and having substantially flat active faces defining said working magnetic fields which lie substantially in a common plane for uniform spacial relationship to an array of articles to be held thereby,
   (e) said array of permanent magnet units comprising a single layer of ceramic permanent magnet wafers to provide a working magnetic field for holding only a predetermined number of layers of articles and thus to facilitate separating one layer of articles from an adjacent layer of articles, (f) said ceramic permanent magnet wafers being arranged in courses at the perimeter of said array of permanent magnet units, (g) said courses extending in loop paths about the perimeter of said array and being of successively opposite polarity.

4. A permanent magnet article transfer assembly comprising (a) permanent magnet supporting means, (b) an array of permanent magnet units of ceramic permanent magnet material carried by said supporting means for conjoint movement therewith, (c) said units being magnetized through a thickness dimension thereof to provide a working magnetic field at at least one side of said array for holding magnetizable articles at said one side of said array for transfer movement therewith, (d) said permanent magnet units being of substantially identical cross sectional dimensions transversely of said thickness dimension and having close lateral proximity to adjacent units to provide a compact assembly and having substantially flat active faces definig said working magnetic fields which lie substantially in a common plane for uniform spacial relationship to an array of articles to be held thereby, (e) said array of permanent magnet units comprising a single layer of ceramic permanent magnet wafers to provide a working magnetic field for holding only a predetermined number of layers of articles and thus to facilitate separating one layer of articles from an adjacent layer of articles, (f) said ceramic permanent magnet wafers being arranged in courses at the perimeter of said array of permanent magnet units, (g) said courses extending in loop paths about the perimeter of said array and being of successively opposite polarity, and (h) said permanent magnet support means having magnetic material extending in spaced relation about the perimeter of said array of permanent magnet units and lying generally in the plane of the active faces of said permanent magnet units to provide a low reluctance flux return path laterally outwardly of the outer course of permanent magnet units.

5. The method of transferring an array of articles having a weight of approximately 46 pounds distributed over an area of approximately 288 square inches which comprises moving a permanent magnet assembly having a lower polar face area of approximately 288 square inches and a weight of approximately 70 pounds together with a discharge shield covering said lower face into vertical alignment above the array of articles, the permanent magnet assembly having an attractive force with respect to the articles of approximately 108 pounds, storing energy in springs interposed between the permanent magnet assembly and the discharge shield as the permanent magnet assembly moves downwardly under the impetus of gravity after engagement of the shield with the array of articles to provide a stored force in the springs of approximately 65 pounds, locking the shield and permanent magnet assembly together to enable transfer of the array of articles with the assembly, and depositing the array of articles on a supporting surface and unlocking the shield from the permanent magnet assembly and raising the permanent magnet assembly to enable the discharge force of the springs to assist in release of the array of articles from the attractive force of the permanent magnet assembly.

6. Permanent magnet transfer apparatus comprising permanent magnet means for retaining articles therewith during a transfer operation, article discharge means movably mounted on said permanent magnet means and movable from a first position to a second position to forcibly disengage articles from said permanent magnet means, and mechanically operated mechanical means coupled to said article discharge means for supplying a mechanical force thereto tending to move said article discharge means from said first position to said second position to disengage articles from said permanent magnet means, said mechanically operated mechanical means comprising spring means interposed between said article discharge means and said permanent magnet means for storing energy during movement of said article discharge means from said second position to said first position and for tending to move said article discharge means from said first position to said second position, the weight of said permanent magnet means together with the attractive force between said permanent magnet means and said articles exceeding the opposing force exerted by said spring means during movement of the article discharge means from the second position to the first position.

7. Permanent magnet transfer apparatus comprising permanent magnet means for retaining articles therewith during a transfer operation, article discharge means movably mounted on said permanent magnet means and relatively movable from a first position to a second position to forcibly disengage articles from said permanent magnet means, spring means connected between said article discharge means and said permanent magnet means for storing energy during movement of said article discharge means from said second position to said first position and for supplying a mechanical force tending to move said article discharge means from said first position to said second position to disengage articles from said permanent magnet means, and means for selectively adjusting the force exerted by said spring means in the first position of said article discharge means, the weight of said permanent magnet means together with the attractive force between said permanent magnet means and said articles exceeding the opposing force exerted by said spring means during movement of the article discharge means from the second position to the first position.

8. Permanent magnet transfer apparatus for magnetizable articles comprising permanent magnet means comprising a base plate of magnetic material with ceramic permanent magnet material secured at the underside of said base plate and having a generally planar polar face at the side of said ceramic permanent magnet material remote from said base for exerting an attractive force on said magnetizable articles to be transferred, mechanical conveyor means connected with said permanent magnet means for lifting said permanent magnet means together with the magnetizable articles attracted thereby during a transfer operation and for lowering said permanent magnet means to deposit the magnetizable articles of a supporting surface, article discharge means connected with said permanent magnet means for joint movement therewith during a transfer operation and mounted for movement relative to said permanent magnet means from a first relative position to a second relative position to disengage the magnetizable articles from the attractive force of said permanent magnet means, said permanent magnet means having a weight approximately 70 pounds and being capable of providing an attractive force substantially greater than its weight, and mechanically operated mechanical means coupled to said article discharge means for supplying a downward force to said article discharge means relative to said permanent magnet means at least of the order of the weight of said permanent magnet means for moving said article discharge means from said first position to said second position to release said magnetizable articles from the attractive force of said permanent magnet means, the weight of said permanent magnet means together with the attractive force between said permanent magnet means and said articles exceeding the opposing force exerted by said mechanically operated mechanical means during movement of the article discharge means from the second position to the first position.

9. The permanent magnet transfer apparatus for magnetizable articles of claim 8 with said mechanically operated mechanical means comprising spring means connected between said permanent magnet means and said article discharge means and storing sufficient energy during engagement of said permanent magnet means with the array of articles to be transferred to exert a force of approximately 65 pounds tending to move said article discharge means from said first position to said second position and a lock selectively operable to lock said article discharge means in said first position.

10. The permanent magnet transfer apparatus for magnetizable articles of claim 8 with said mechanically operated mechanical means comprising spring means connected between said permanent magnet means and said article discharge means and storing sufficient energy during engagement of said permanent magnet means with the array of articles to be transferred to exert a force of approximately 65 pounds tending to move said article discharge means from said first position to said second position, and solenoid and armature means each coupled with one of said permanent magnet means and said article discharge means for selectively locking said article discharge means in said first position.

11. The permanent magnet transfer apparatus for magnetizable articles of claim 8 with said mechanically operated mechanical means comprising at least four vertical shafts connected with said article discharge means and extending through said permanent magnet means to the upper side of said base plate and fluid pressure operated cylinder and piston means each coupled to one of said base plate and said vertical shafts for exerting a downward force on said article discharge means relative to said base plate.

12. The permanent magnet transfer apparatus for magnetizable articles of claim 8 with said mechanically operated mechanical means comprising a conveyor plate above said base plate and having at least four vertical shafts connected with said conveyor plate and extending through said permanent magnet means and connected with said article discharge means, links pivotally mounted at the upper side of said base plate and having respective first ends fixed to said conveyor plate and respective second ends, and selectively operable lifting means coupled to said second ends of said links for exerting a lifting force thereon, and said mechanical conveyor means comprising selectively operable lifting means coupled directly to said conveyor plate.

13. Permanent magnet transfer apparatus for magnetizable articles comprising permanent magnet means for retaining said magnetizable articles therewith during a transfer operation, magnetizable article discharge means movably mounted on said permanent magnet means and movable from a first position to a second position to forcibly disengage magnetizable articles from said permanent magnet means, energy storage means coupled to said magnetizable article discharge means for storing energy during movement of said magnetizable article discharge means from said second position to said first position during engagement of magnetizable articles with said permanent magnet means and tending to urge said magnetizable article discharge means from said first position to said second position, the weight of said permanent magnet means together with the attractive force between said permanent magnet means and said magnetizable articles exceeding the opposing force exerted by said energy storage means upon movement of the permanent magnet means into position on said magnetizable articles, said opposing force of said energy storage means being greater than the attractive force between said permanent magnet means and said magnetizable articles minus the weight of said magnetizable articles and means for locking said magnetizable article discharge means in said first position to prevent effective operation of said energy storage means during lifting of said magnetizable articles by said permanent magnet means and for unlocking said magnetizable article discharge means to provide for discharge of said magnetizable articles under the impetus of said energy storage means.

14. Permanent magnet transfer apparatus for transferring magnetizable articles comprising permanent magnet means for retaining said magnetizable articles therewith during a transfer operation, article discharge means movably mounted on said permanent magnet means and movable from a first position to a second position to forcibly disengage said magnetizable articles from said permanent magnet means, energy storage means coupled to said article discharge means for automatically storing energy during movement of said article discharge means from said second position to said first position during engagement of said magnetizable articles with said permanent magnet means and tending to urge said article discharge means from said first position to said second position, the weight of said permanent magnet means together with the attractive force between said permanent magnet means and said magnetizable articles exceeding the opposing force exerted by said energy storage means upon movement of the permanent magnet means into position on said magnetizable articles, the force exerted by said energy storage means plus the weight of said magnetizable articles exceeding the attractive force between the permanent magnet means and the magnetizable articles, and means for locking said article discharge means in said first position to accommodate lifting of said magnetizable articles by said permanent magnet means and for unlocking said article discharge means to provide for discharge of said magnetizable articles by the action of said energy storage means in conjunction with a lifting force excerted on said permanent magnet means.

15. Permanent magnet transfer apparatus in accordance with claim 14 with said energy storage means comprising compression spring means interposed between said article discharge means and said permanent magnet means.

16. Permanent magnet transfer apparatus in accordance with claim 13 with said locking mechanism comprising a mechanical latching device.

17. Permanent magnet transfer apparatus in accordance with claim 13 with said locking mechanism comprising an electromagnet carried by said permanent magnet means and armature means secured to said article discharge means and positioned in close proximity to said electromagnet in said first position of said article discharge means for retention thereby during a transfer operation.

18. Permanent magnet transfer apparatus for magnetizable articles comprising permanent magnet means comprising a base plate of magnetic material with ceramic permanent magnet material secured at the underside of said base plate and having a generally planar polar face at the side of said ceramic permanent magnet material remote from said base for exerting an attractive force on said magnetizable articles to be transferred, mechanical conveyor means connected with said permanent magnet means for lifting said permanent magnet means together with the magnetizable articles attracted thereby during a transfer operation and for lowering said permanent magnet means to deposit the magnetizable articles on a supporting surface, article discharge means connected with said permanent magnet means for joint movement therewith during a transfer operation and mounted for movement relative to said permanent magnet means from a first relative position to a second relative position to disengage the magnetizable articles from the attractive force of said permanent magnet means, said permanent magnet means weighing a particular amount and being capable of providing an attractive force substantially greater than said weight, and mechanically operated means coupled to said article discharge means for supplying a downward force to said article discharge means relative to said permanent magnet means for moving said article discharge means from said first position to said second position to release said magnetizable articles from the attractive force of said permanent magnet means, the weight of said permanent magnet means together with the attractive force between said permanent magnet means and said articles exceeding the opposing force exerted by said mechanically operated mechanical means during movement of the article discharge means from the second position to the first position.

19. The permanent magnet transfer apparatus for magnetizable articles of claim 18 with said opposing force of said energy storage means being greater than the attractive force between said permanent magnet means and said magnetizable articles minus the weight of said magnetizable articles.

20. A permanent magnet article transfer assembly comprising permanent magnet supporting means, and an array of permanent magnet units carried by said supporting means for conjoint movement therewith, said units being magnetized through a thickness dimension thereof to provide a working magnetic field at at least one side of said array for holding magnetizable articles at said one side of said array for transfer movement therewith, said permanent magnet units being of substantially identical cross sectional dimensions transversely of said thickness dimension and being substantially in engagement with laterally adjacent units to provide a compact assembly and having substantially flat active faces defining said working magnetic field which lie substantially in a common plane for uniform spacial relationship to an array of articles to be held thereby, and said array of permanent magnet units being divided into at least two groups of permanent magnet units with each group of permanent magnet units being spaced from its adjoining group by a distance less than one half the thickness of one of said units.

21. A permanent magnet article transfer assembly comprising permanent magnet supporting means, and an array of permanent magnet units carried by said supporting means for conjoint movement therewith, said units being magnetized through a thickness dimension thereof to provide a working magnetic field at at least one side of said array for holding magnetizable articles at said one side of said array for transfer movement therewith, said permanent magnet units being substantially in engagement with laterally adjacent units to provide a compact assembly and having substantially flat active faces defining said working magnetic field which lie substantially in a common plane for uniform spacial relationship to an array of articles to be held thereby, and said array of permanent magnet units being divided into at least two groups of permanent magnet units with each group of permanent magnet units being spaced from its adjoining group by a distance less than one half the thickness of one of said units.

22. A permanent magnet article transfer assembly in accordance with claim 21, and means for maintaining said supporting means in a rigid substantially flat planar condition during a transfer operation.

23. A permanent magnet article transfer assembly comprising permanent magnet supporting means, an array of permanent magnet units of ceramic permanent magnet material carried by said supporting means for conjoint movement therewith, said units being magnetized through the thickness dimension thereof to provide a working magnetic field at at least one side of said array for holding magnetizable articles at said one side of said array for transfer movement therewith, said permanent magnet units having close lateral proximity to adjacent units to provide a compact assembly and having substantially flat active faces defining said working magnetic field which lie substantially in a common plane for uniform spacial relationship to an array of articles to be held thereby, discharge means of non-magnetic material mounted on said permanent magnet supporting means in overlying relation to the active faces of said permanent magnet units, said discharge means of non-magnetic material being disposed at said one side of said array between said array and the articles to be transferred thereby for engaging the articles and having ribs for rigidifying said discharge means, and means mounting said discharge means for movement relative to said permanent magnet supporting means to relatively move said articles away from said active faces of said permanent magnet units to release said articles from the effective holding field of said units while maintaining said articles in an array substantially identical to their array while held by said permanent magnet units, said array of permanent magnet units providing a blanket type working magnetic field of substantially uniform depth over the entire area thereof, and said array of permanent magnet units being divided into at least two groups of permanent magnet units with each group of permanent magnet units being spaced from its adjoining group by a sufficient distance to permit said ribs of said discharge means to nest between said groups of permanent magnet units when said discharge means is in close proximity to said array of permanent magnet units.

References Cited by the Examiner

UNITED STATES PATENTS

| | | | |
|---|---|---|---|
| 2,600,849 | 6/1952 | Collins | 294—88 |
| 2,958,019 | 10/1960 | Scholten | 317—159 |
| 3,079,191 | 2/1963 | Engelsted | 294—65.5 |

FOREIGN PATENTS

| | | |
|---|---|---|
| 536,971 | 2/1957 | Canada. |

GERALD M. FORLENZA, *Primary Examiner.*

ERNEST A. FALLER, *Examiner.*

G. ABRAHAM, *Assistant Examiner.*